United States Patent
Hui et al.

(10) Patent No.: US 10,129,202 B2
(45) Date of Patent: Nov. 13, 2018

(54) OPTIMIZING GLOBAL IPV6 ADDRESS ASSIGNMENTS

(71) Applicant: Cisco Technology, Inc., San Jose, CA (US)

(72) Inventors: Jonathan Hui, Belmont, CA (US); Ralph E. Droms, Concord, MA (US); Paul B. Duffy, Acton, MA (US); Wei Hong, Berkeley, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1024 days.

(21) Appl. No.: 14/552,655

(22) Filed: Nov. 25, 2014

(65) Prior Publication Data

US 2016/0149856 A1   May 26, 2016

(51) Int. Cl.
| | | |
|---|---|---|
| *H04L 12/28* | (2006.01) | |
| *H04L 29/12* | (2006.01) | |
| *H04L 12/741* | (2013.01) | |
| *H04L 12/751* | (2013.01) | |
| *H04L 12/753* | (2013.01) | |

(52) U.S. Cl.
CPC .......... *H04L 61/2015* (2013.01); *H04L 45/74* (2013.01); *H04L 61/6059* (2013.01); *H04L 45/02* (2013.01); *H04L 45/48* (2013.01)

(58) Field of Classification Search
CPC . H04L 61/2015; H04L 61/6059; H04L 45/02; H04L 45/48; H04L 45/74
See application file for complete search history.

(56) References Cited

U.S. PATENT DOCUMENTS

| | | | | |
|---|---|---|---|---|
| 7,870,265 B2 * | 1/2011 | Kramer | ............... | H04L 67/1008 709/227 |
| 8,103,781 B1 * | 1/2012 | Wu | ................... | H04L 29/12028 709/223 |
| 8,681,695 B1 * | 3/2014 | Krishnan | ............ | H04L 61/2015 370/328 |
| 2006/0080728 A1 * | 4/2006 | Wen | .................... | H04L 12/2859 726/4 |

(Continued)

OTHER PUBLICATIONS

Gnawali et al., "The Minimum Rank with Hysteresis Objective Function", Request for Comments 6719, Sep. 2012, 13 pages, Internet Engineering Task Force Trust.

(Continued)

*Primary Examiner* — Alvin Zhu
(74) *Attorney, Agent, or Firm* — Parker Ibrahim & Berg LLP; James M. Behmke; Stephen D. LeBarron

(57) ABSTRACT

In one embodiment, a device in a network determines that one or more network nodes should use a stateful address configuration protocol to obtain network addresses. The device causes the one or more network nodes to use the stateful address configuration protocol, in response to determining that the one or more nodes should use the stateful address configuration protocol to obtain network addresses. The device determines that the one or more network nodes should use a stateless address configuration protocol to obtain network addresses. The device causes the one or more network nodes to use the stateless address configuration protocol, in response to determining that the one or more nodes should use the stateless address configuration protocol to obtain network address.

23 Claims, 18 Drawing Sheets

(56) References Cited

U.S. PATENT DOCUMENTS

| | | | | |
|---|---|---|---|---|
| 2012/0314624 A1* | 12/2012 | Asati | ............... | H04L 61/1511 370/257 |
| 2013/0100958 A1* | 4/2013 | Jalan | ............... | H04L 67/1027 370/401 |
| 2013/0232278 A1* | 9/2013 | Zou | ............... | H04L 61/251 709/245 |
| 2016/0132397 A1* | 5/2016 | Hui | ............... | H04W 40/24 714/4.11 |

OTHER PUBLICATIONS

Hui et al., "An IPv6 Routing Header for Source Routes with the Routing Protocol for Low-Power and Lossy Networks (RPL)", Request for Comments 6554, Mar. 2012, 13 pages, Internet Engineering Task Force Trust.

Shelby et al., "Neighbor Discovery Optimization for IPv6 over Low-Power Wireless Personal Area Networks (6LoWPANs)", Request for Comments 6775, Nov. 2012, 55 pages, Internet Engineering Task Force Trust.

Thubert P., "Objective Function Zero for the Routing Protocol for Low-Power and Lossy Networks (RPL)", Request for Comments 6552, Mar. 2012, 14 pages, Internet Engineering Task Force Trust.

Vasseur et al., "Routing Metrics Used for Path Calculation in Low-Power and Lossy Networks", Request for Comments 6551, Mar. 2012, 30 pages, Internet Engineering Task Force Trust.

Winter et al., "RPL: IPv6 Routing Protocol for Low-Power and Lossy Networks", Request for Comments 6550, Mar. 2012, 157 pages, Internet Engineering Task Force Trust.

"IPv6 Ready Phase-1/Phase-2 Test Specification Core Protocols", Technical Document, https://www.ipv6ready.org/docs/Core_Conformance_Latest.pdf, Apr. 26, 2010, Revision 4.0.6, 301 pages, University of New Hampshire InterOperability Laboratory, Yokogawa Electric Corporation, and IPv6 Forum.

\* cited by examiner

OPTIMIZING GLOBAL IPV6 ADDRESS ASSIGNMENTS

TECHNICAL FIELD

The present disclosure relates generally to computer networks, and, more particularly, to optimizing global IPv6 address assignments.

BACKGROUND

The Internet Engineering Task Force (IETF) has standardized the latest version of the Internet Protocol (IP), IP version 6 (IPv6). One of the main drivers in updating the IP standard was the fear of address exhaustion in IPv4. In particular, when IPv4 was released in 1981, it was thought that the IPv4 address space provided by 32-bit IP addresses was more than sufficient to support future growth of the Internet. However, the explosion in the number of computing devices in the past several decades has necessitated a larger address space. Accordingly, IPv6 uses 128-bit addresses, which support an address space that is orders of magnitude greater than that of IPv4. Other differences between IPv6 and IPv4 include greater support for multicasting, more efficient packet headers, etc. Despite the advantages of IPv6, many devices still use IPv4 due to existing infrastructure that supports IPv4. However, it is expected that IPv6 will supplant IPv4 as the dominant protocol over time.

Low-Power and Lossy Networks (LLNs) are one form of network that may use IP addresses to identify individual devices an LLN. LLNs, e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
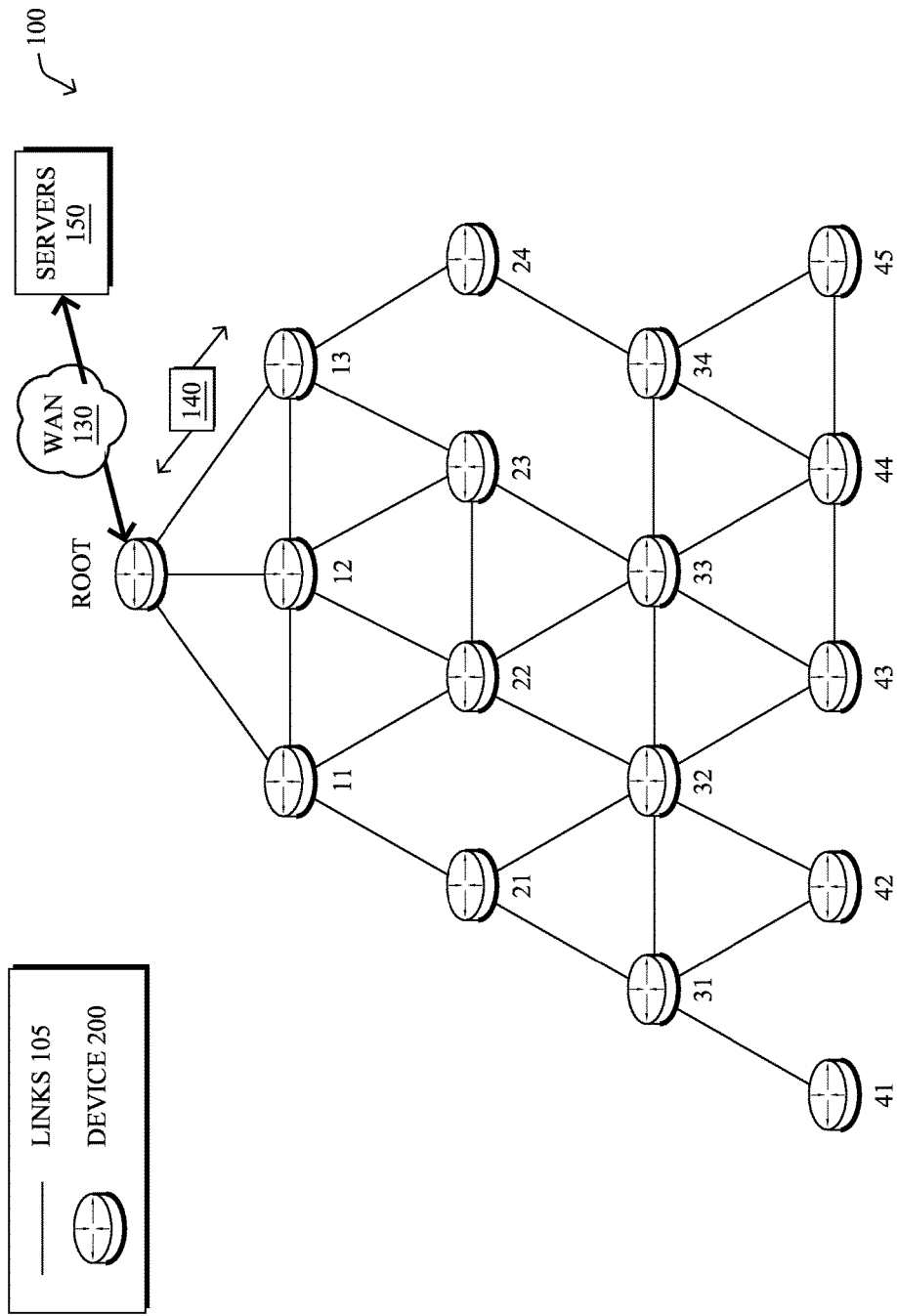
FIG. 1 illustrates an example communication network.

According to one or more embodiments of the disclosure, a device in a network determines that one or more network nodes should use a stateful address configuration protocol to obtain network addresses. The device causes the one or more network nodes to use the stateful address configuration protocol, in response to determining that the one or more nodes should use the stateful address configuration protocol to obtain network addresses. The device determines that the one or more network nodes should use a stateless address configuration protocol to obtain network addresses. The device causes the one or more network nodes to use the stateless address configuration protocol, in response to determining that the one or more nodes should use the stateless address configuration protocol to obtain network addresses.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
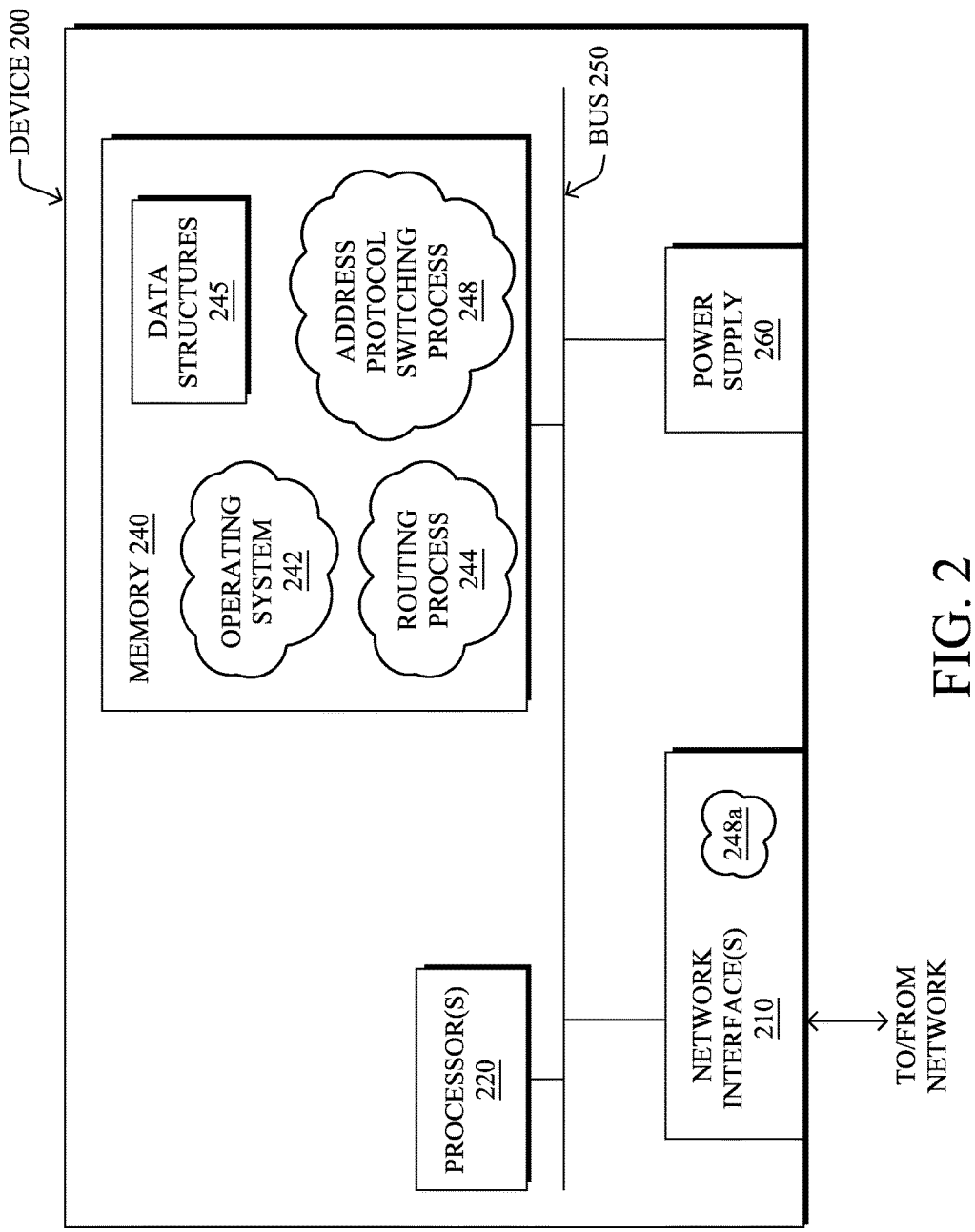
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative address protocol switching process 248, as described herein.

Note that while address protocol switching process 248 is shown in centralized memory 240, alternative embodiments provide for process 248 to be specifically operated within the network interfaces 210 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
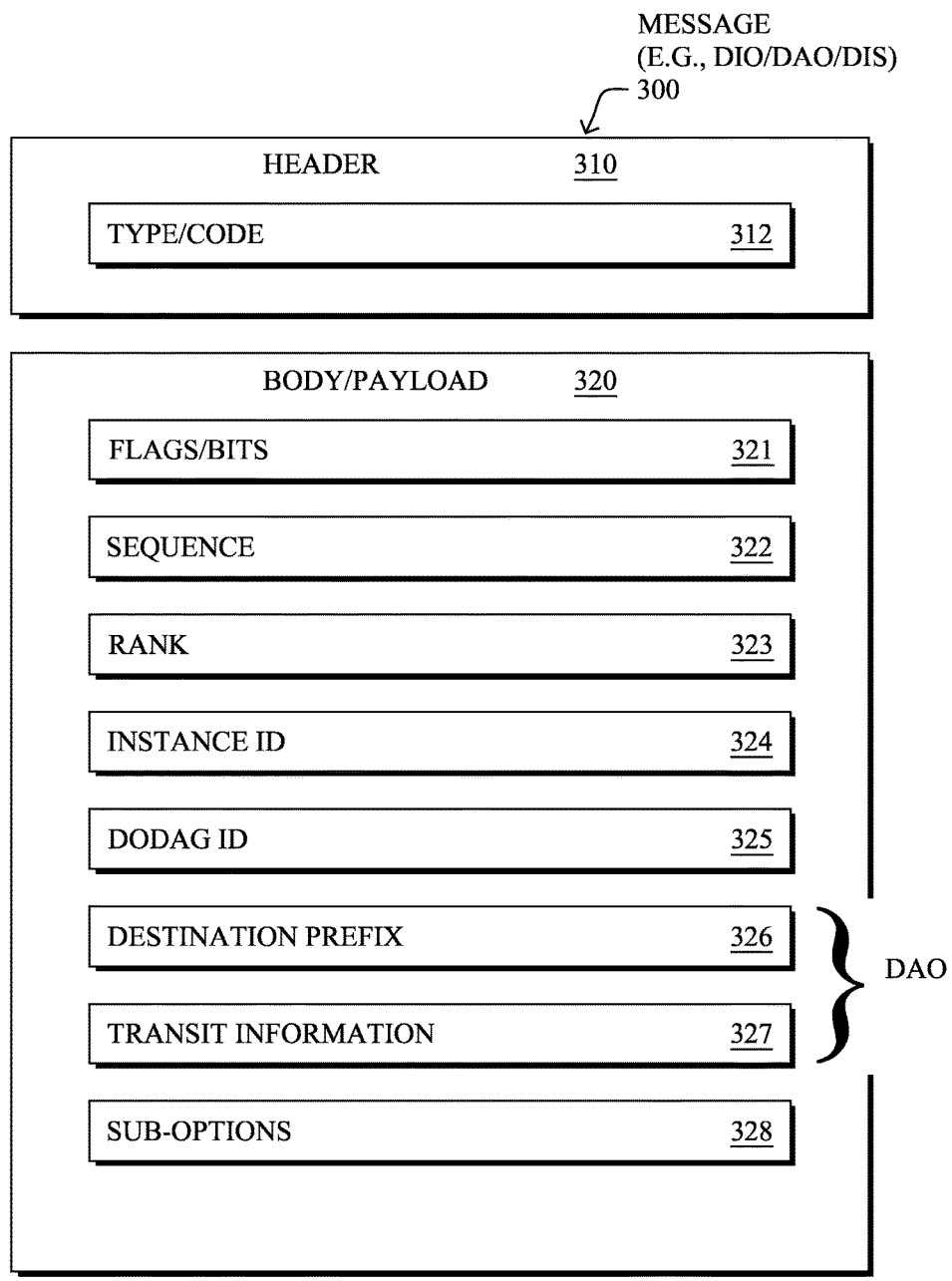
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
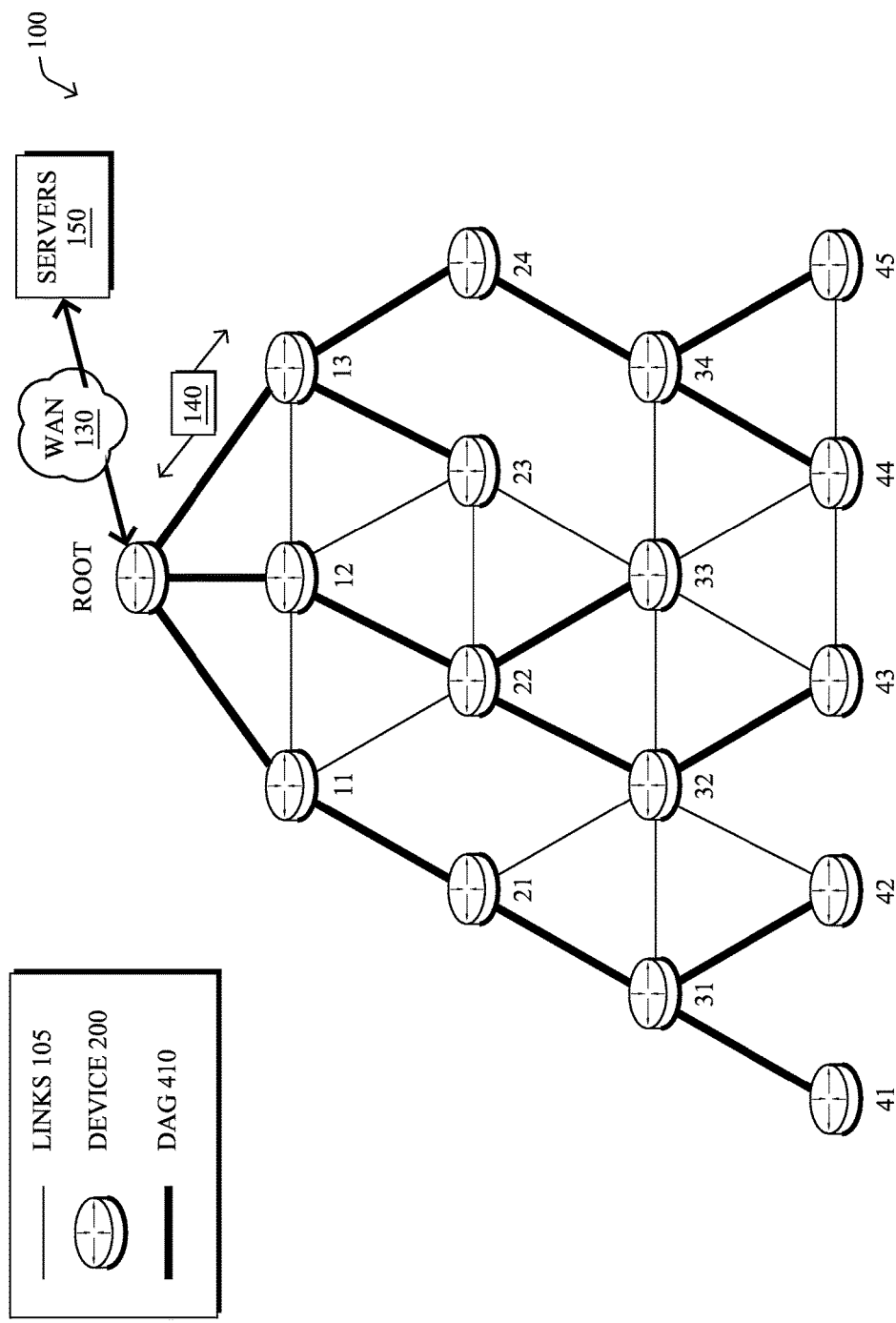
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, LLNs such as Smart Grid Advanced Metering Infrastructure (AMI) networks may use IPv6 addresses. Thus, IPv6 address configuration is needed before network devices/nodes can begin communicating IPv6 packets. Some LLN deployments may use the Dynamic Host Configuration Protocol version 6 (DHCPv6), which was designed in conjunction with IPv6. DHCPv6 is a stateful address configuration protocol, meaning that address assignments may be managed by a centralized DHCP server.

One benefit of using DHCPv6 in LLN deployments is the ability of the DHCP server to minimize entropy in the assigned addresses, enabling more effective use of IPv6 source route compression. Notably, the IETF Proposed Standard RFC 6554 entitled "An IPv6 Routing Header for Source Routes with the Routing Protocol for Low-Power and Lossy Networks (RPL)" by Hui, et al. (March 2012) provides techniques that allow the common IPv6 prefix bits to be elided whenever they are the same across all entries. For example, a typical Smart Grid AMI deployment may connect up to 5,000 devices under a single IPv6 prefix. When using DHCPv6, it is possible to ensure that all IPv6 addresses are generated from a small pool (e.g., 16 bits). As a result, it is possible to elide 14 of the 16 bytes in each entry of an IPv6 source route header.

Certain situations may exist in LLNs that make the use of DHCPv6, or other stateful address configuration protocols, less than ideal. For example, DHCPv6 messages in an LLN may be communicated to the DHCP server via an LLN border router (LBR) that functions as the Root node for the local network. Thus, the amount of DHCPv6 traffic through the LBR will grow linearly with the number of nodes in the local network serviced by the LBR. During network formation, for example, the DHCPv6 traffic may be bottlenecked these communications, thereby delaying the overall network formation time.

Alternative address configuration protocols include stateless protocols that allow individual devices to configure their own IPv6 addresses. For example, the Stateless Address Autoconfiguration (SLAAC) protocol allows each device to obtain a routable IPv6 prefix from a neighbor and use the prefix to form a routable IPv6 address with an interface identifier (IID) derived from a EUI-64 MAC address. For example, a device may obtain an IPv6 prefix from a neighbor using Internet Control Message Protocol version 6 Router Advertisement (ICMPv6 RA) messages or the like. If the EUI-64 MAC address is assumed to be unique, all communication necessary for forming routable IPv6 addresses remains within link-local scope for each device.

In contrast to DHCPv6 in which message complexity grows linearly with the number of devices attached to an LBR, the number of messages for SLAAC is limited to a single broadcast by each device for communicating the IPv6 prefix. However, while SLAAC enables an LLN to form more quickly than when using DHCPv6, the routable IPv6 addresses are also not as compressible and there is a slight chance of duplicate address assignment. Notably, in the best case, only the 8-byte prefix is common among devices using SLAAC, since the 8-byte IID is based on the MAC address. As a result, source routing using SLAAC-based addresses incurs an overhead of six to seven bytes per hop.

Optimizing Global IPv6 Address Assignments

The techniques herein provide for network devices/nodes to dynamically switch between using a stateful address configuration protocol (e.g., DHCPv6) and a stateless address configuration protocol (e.g., SLAAC). In some aspects, a supervisory device (e.g., an LBR/Root node, etc.) may dynamically enable the use of the stateful address configuration protocol network-wide when it determines that the added overhead is acceptable. In another aspect, the supervisory device may instruct only a subset of nodes/devices to use the stateful protocol based a traffic profile associated with the subset. In a further aspect, the supervisory device may indicate client parameters based on the acceptable overhead of using the stateful address configuration protocol and the number of devices expected to use the stateful protocol. In another aspect, the supervisory device may dynamically cause nodes/devices to use the stateless address configuration protocol when it determines that use of the stateless protocol may be beneficial. In yet another aspect, techniques are disclosed that allow for the seamless updating of routing information in conjunction with an address protocol switchover.

Specifically, according to one or more embodiments of the disclosure as described in detail below, a device in a network determines that one or more network nodes should use a stateful address configuration protocol to obtain network addresses. The device causes the one or more network nodes to use the stateful address configuration protocol, in response to determining that the one or more nodes should use the stateful address configuration protocol to obtain network addresses. The device determines that the one or more network nodes should use a stateless address configuration protocol to obtain network addresses. The device causes the one or more network nodes to use the stateless address configuration protocol, in response to determining that the one or more nodes should use the stateless address configuration protocol to obtain network address.

Illustratively, the techniques described herein may be performed by hardware, software, and/or firmware, such as in accordance with the address protocol switching process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Figure 5A:
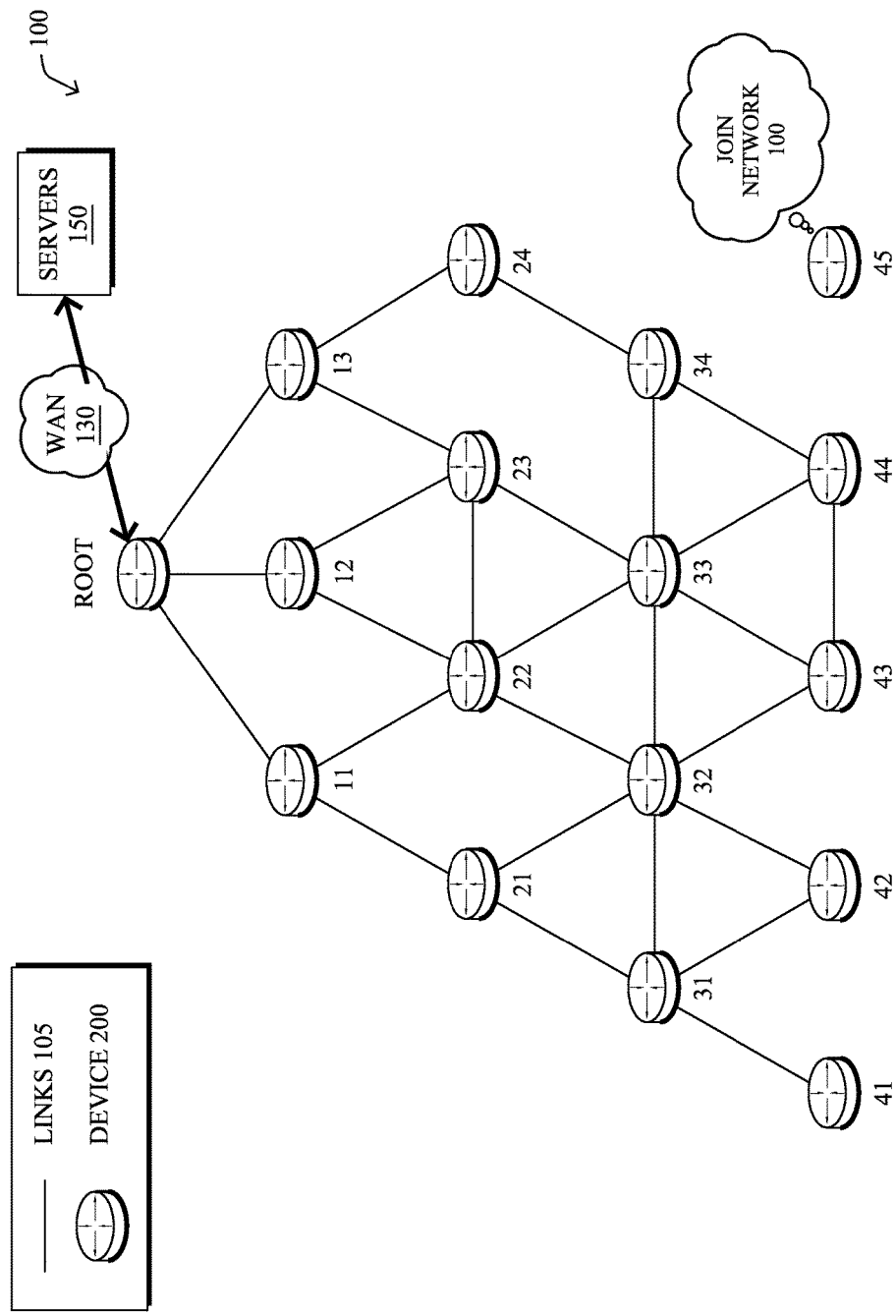
FIGS. 5A-5D illustrate examples of a network address being assigned to a joining device.
Figure 5B:
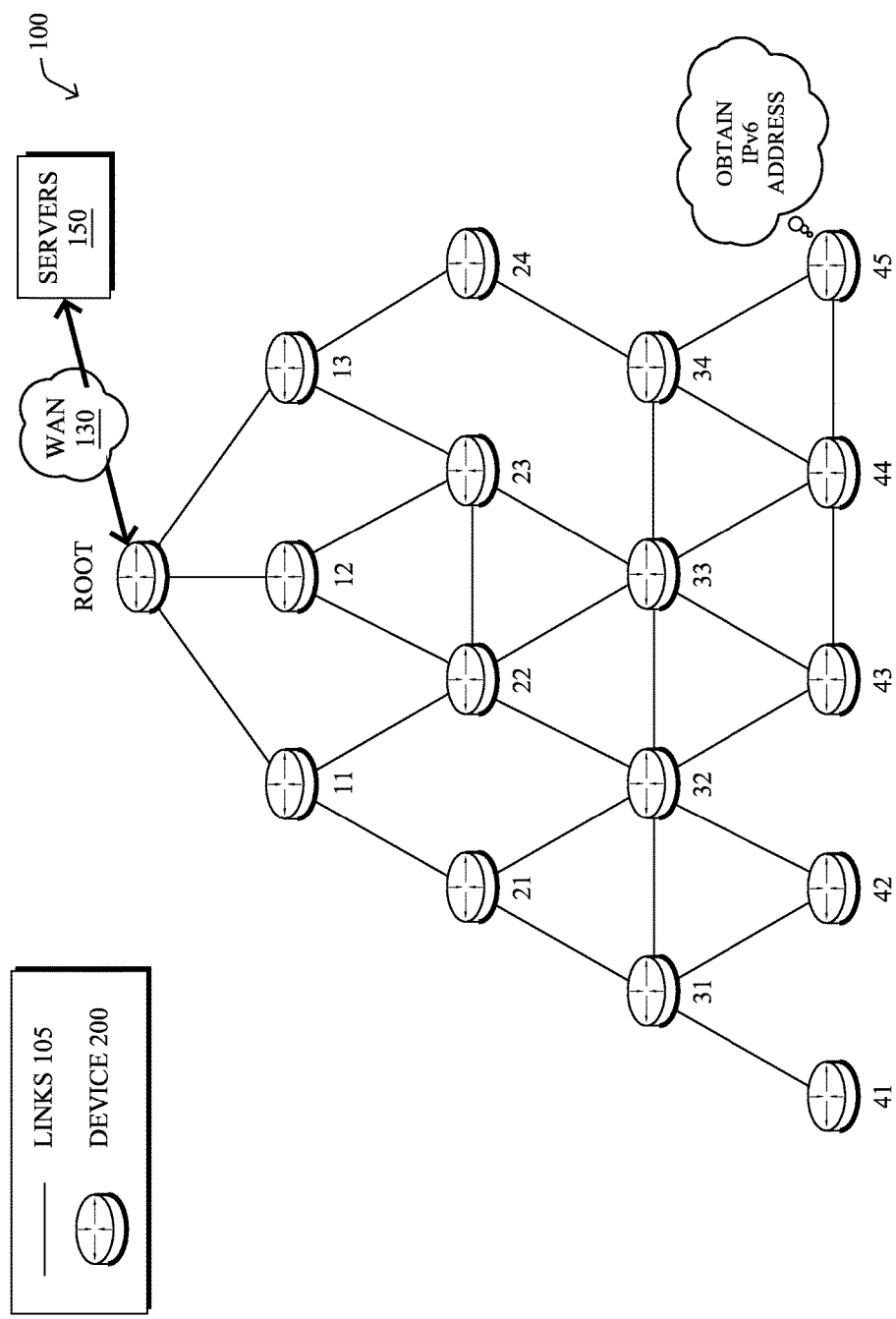
Figure 5C:
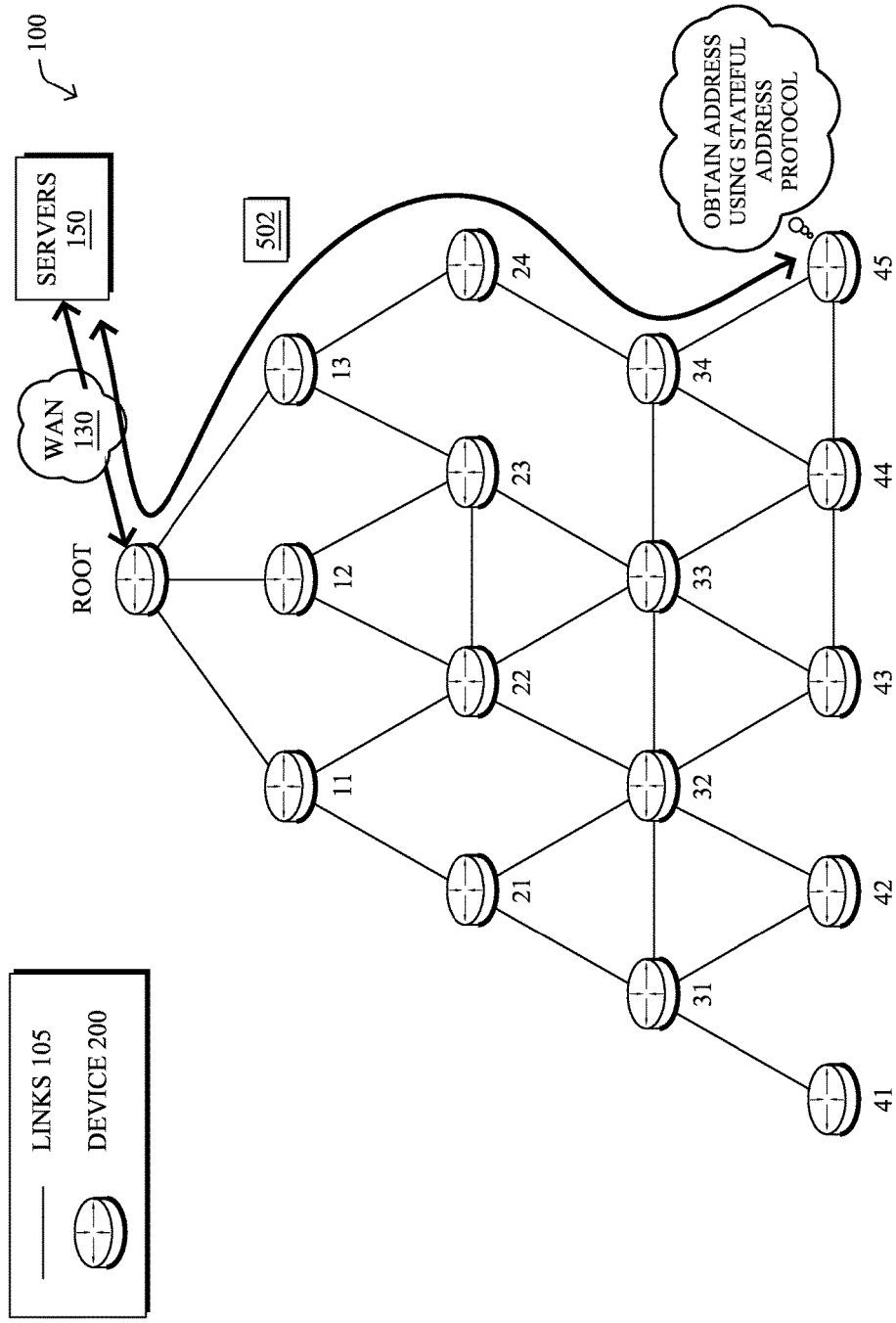
Figure 5D:
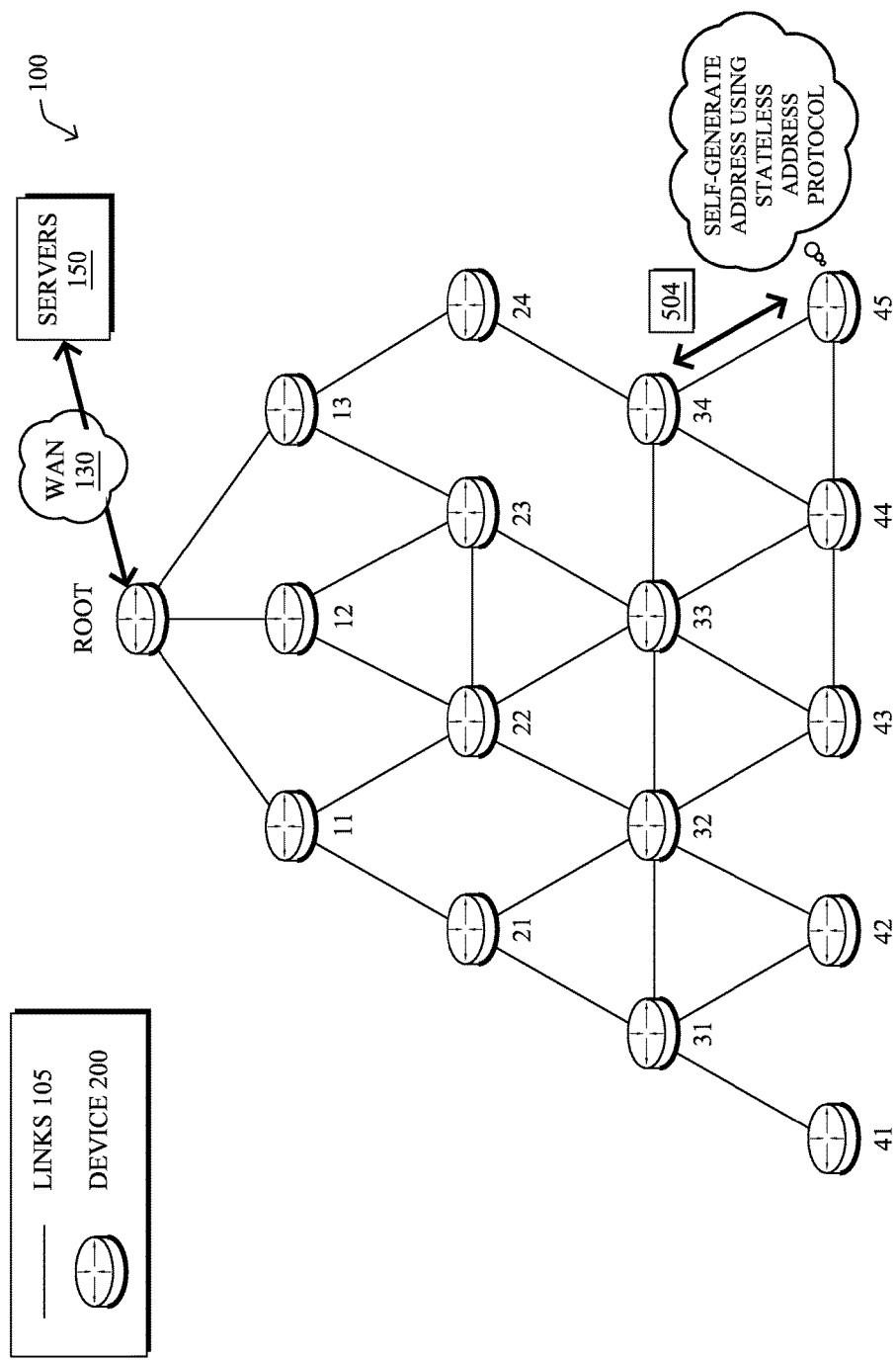

Operationally, a network device may optimize IPv6 address assignments by dynamically selecting between address configuration protocols, to minimize network formation latency and also maximizing opportunities for IPv6 address compression. For example, FIGS. 5A-5D illustrate examples of a network address being assigned to a joining device. As shown in FIG. 5A, assume that node 45 is to join network 100 (e.g., during initial network formation, after a power outage event, etc.) and requires an IPv6 address, as illustrated in FIG. 5B. In some cases, node 45 may use a stateful address configuration protocol (e.g., DHCPv6) to obtain its IPv6 address. For example, as shown in FIG. 5C, node 45 may exchange DHCPv6 traffic 502 with a DHCP server (e.g., one of servers 150) via the LBR/Root node. However, as noted above, the DHCPv6 traffic 502 through the Root node may present a bottleneck condition when a large number of devices join the network at the same time. As shown in FIG. 5D, node 45 may alternatively use a stateless address configuration protocol, to obtain its IPv6 address. For example, node 45 may receive an IPv6 prefix from a neighboring node (e.g., node 34) via a message 504 (e.g., an ICMPv6 RA message, an RPL DIO message, etc.) and use the prefix to self-generate its IPv6 address.

In some embodiments, nodes may be defaulted to using a stateless address configuration protocol (e.g., SLAAC or the like). Thus, network nodes may use the stateless protocol when joining the network and until specifically instructed to switch over to using a stateful address configuration protocol (e.g., switch over to using DHCPv6). For example, FIGS. 6A-6D illustrate examples of network devices switching to using a stateful address protocol (e.g., after using the stateless address protocol for network formation or reformation after a power outage event).

Figure 6A:
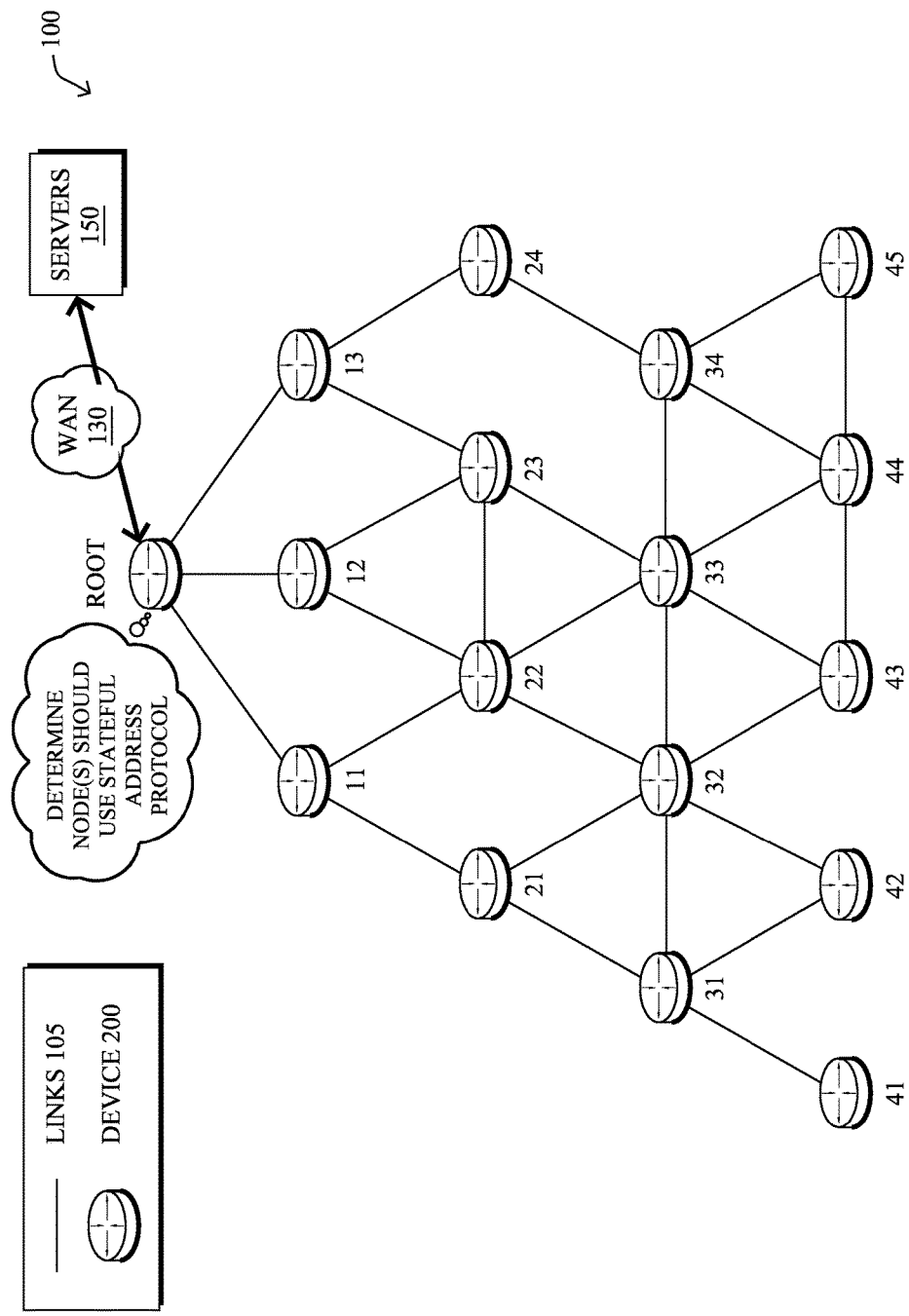
FIGS. 6A-6D illustrate examples of network devices switching to using a stateful address configuration protocol.

The use of a stateful address configuration protocol may be initiated within the network in a number of ways. As shown in FIG. 6A, a supervisory device such as the LBR/Root node may determine that one or more of nodes 11-45 should use DHCPv6 or another stateful address configuration protocol. In other embodiments, another supervisory device such as a network management system/server (NMS) (e.g., one of servers 150) may determine when address protocol switchovers should occur and initiate a switchover.

In general, the supervisory device may determine that the stateful address configuration protocol should be used in the network when the costs associated with using the protocol outweigh the costs associated with using a stateless address configuration protocol. In one example, the supervisory device may determine that the stateful protocol should be used based on a determination that network formation has stabilized/completed. For example, the LBR/Root may disable DHCPv6 when its LLN interface is enabled after some period of time after being disabled or following an extended power outage event. In another example, the supervisory device may only enable the use of DHCPv6 or another stateful address configuration protocol, if the rate of IPv6 source route messages exceeds a threshold.

Other factors that the supervisory device may consider when determining which address configuration protocol to use in the network may include, but are not limited to, the number of devices that are expected to initiate stateful address protocol traffic in the near future, the expected traffic overhead over time associated with using the stateful protocol (e.g., based on lease durations), the reduction in source route header overhead due to reduced entropy in address spaces when using the stateful protocol, the reduction in IPv6 header overhead due to providing 6LoWPAN compression contexts in the stateful protocol replies (e.g., DHCPv6 replies), or other such factors.

Figure 6B:
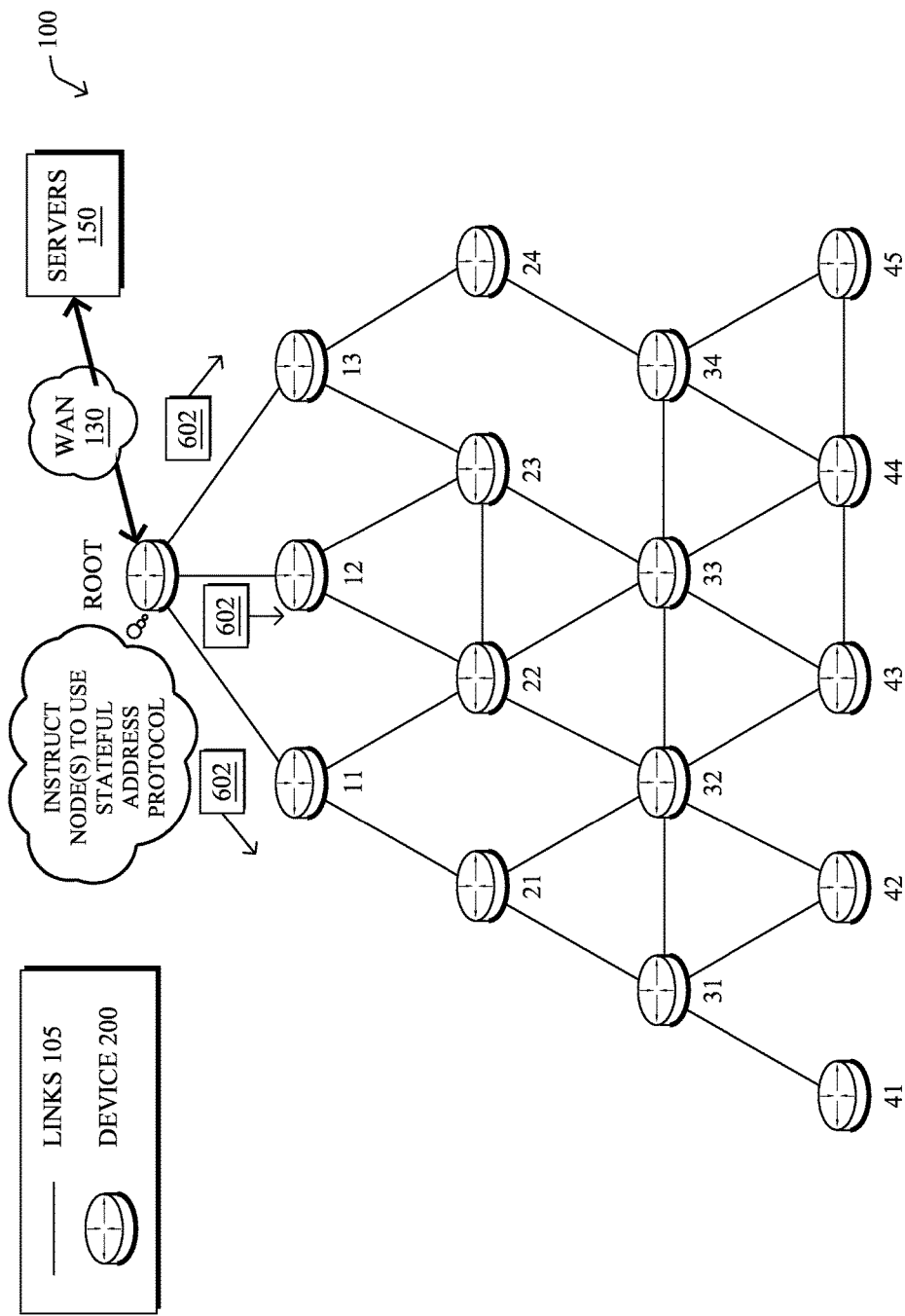

As shown in FIG. 6B, the supervisory device may cause one or more of the network nodes to switch to using the stateful address configuration protocol, in response to determining that the node(s) should use the stateful protocol. For example, the LBR/Root node may send one or more instructions 602 to the one or more nodes, to cause the nodes to switch protocols. In some embodiments, instructions 602 may be network-wide indicators send to all of the connected nodes 11-45. For example, the LBR/Root device may send instructions 602 within IEEE 802.15.4e-2012 Enhanced Beacons, RPL DIO messages, or the like.

Figure 6C:
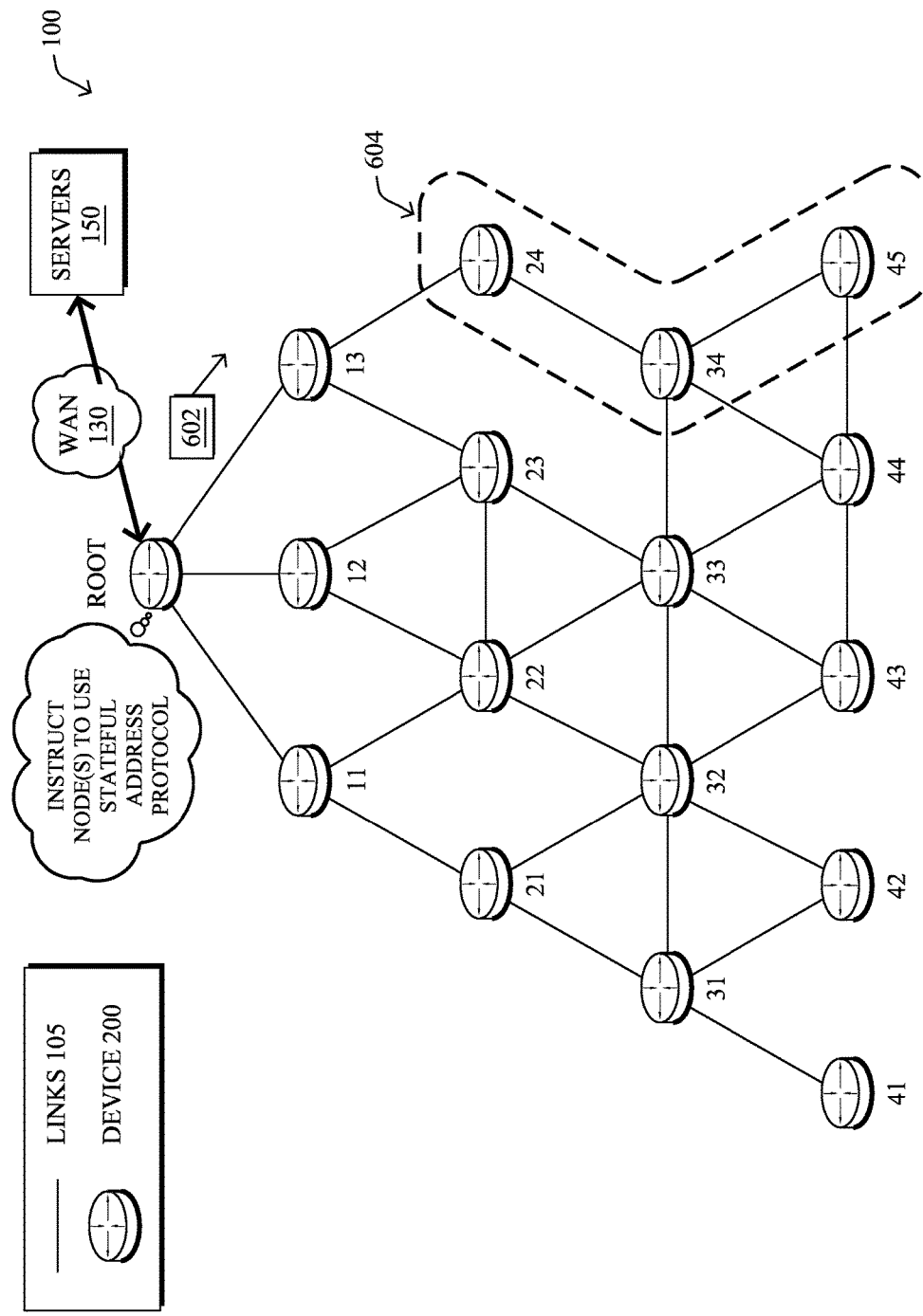

In some cases, the supervisory device may dynamically enable the use of a stateful address protocol (e.g., DHCPv6) on only a subset of the nodes in the local network. For example, as shown in FIG. 6C, the LBR/Root node may send instructions 602 to only a subset 604 of nodes in the network, to enable their use of DHCPv6. In one embodiment, the supervisory device may enable the use of the stateful address protocol in only a subset of the network nodes, in response to determining that the vast majority of traffic is only traversing that subset of nodes. Instructions 602 may be sent to the nodes in subset 604 as unicast messages to the individual nodes or, alternatively, as a multicast message. Such a multicast message may explicitly identify each node in subset 604 or use a probabilistic technique to identify the nodes (e.g., using a Bloom filter or the like).

Figure 6D:
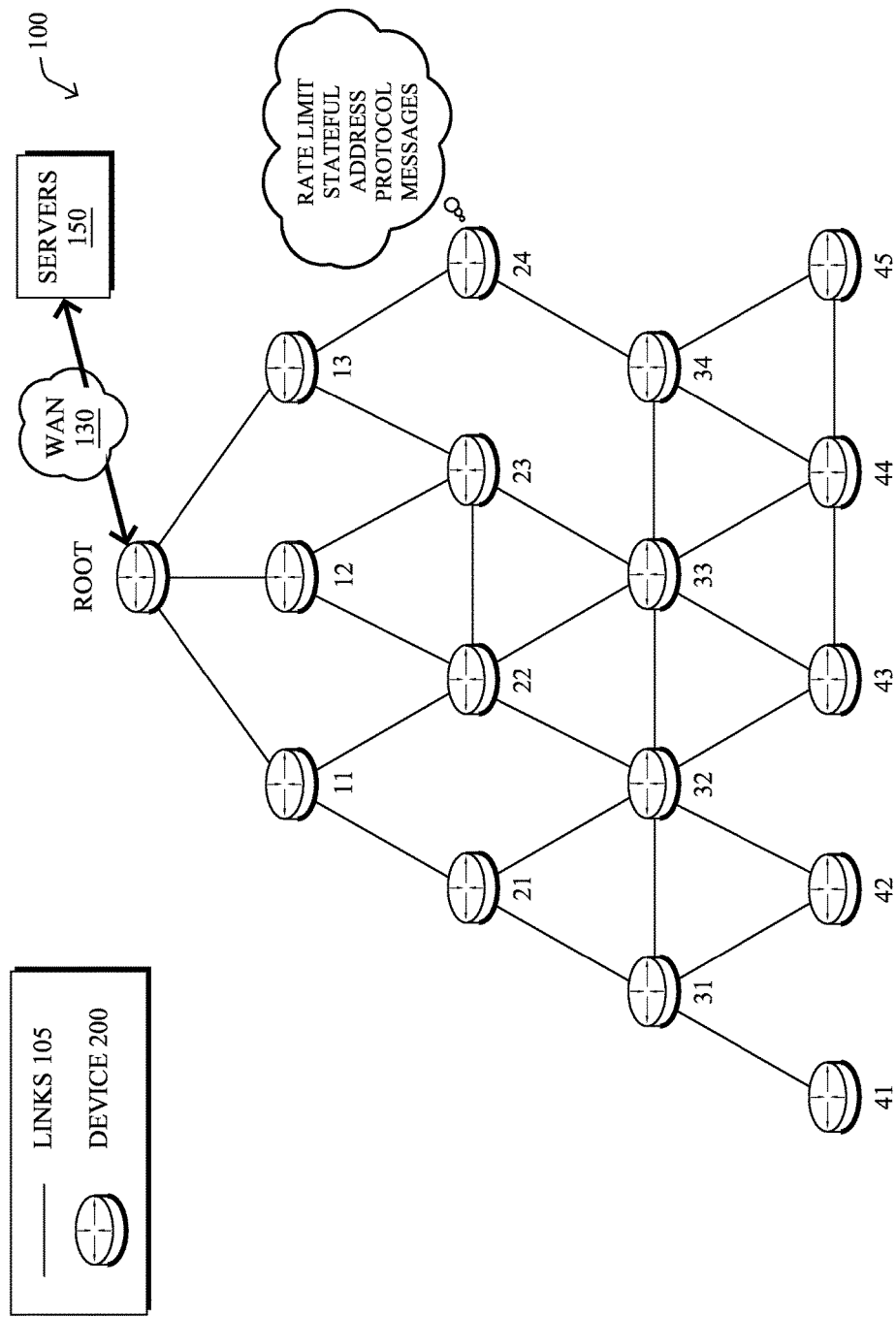

In some embodiments, nodes/devices may be configured to rate limit messages associated with the stateful address configuration protocol. For example, as shown in FIG. 6D, assume that DHCPv6 has been enabled on node 24. In such a case, node 24 may be configured to limit the amount of DHCPv6 traffic that it generates. For example, node 24 may not advertise its use of DHCPv6 until after it successfully receives a DHCPv6 reply, allowing the process to progress naturally hop-by-hop. In another embodiment, the DHCPv6 indicator may include parameters that control the DHCPv6 client parameters such as a minimum solicit period or a maximum solicit period. For example, the LBR/Root device may have information regarding the number of nodes in network 100 that are going to perform DHCPv6 and the corresponding topology. In such a case, the LBR/Root device may adjust these DHCPv6 client timer parameters to limit the expected traffic in the mesh.

Figure 7A:
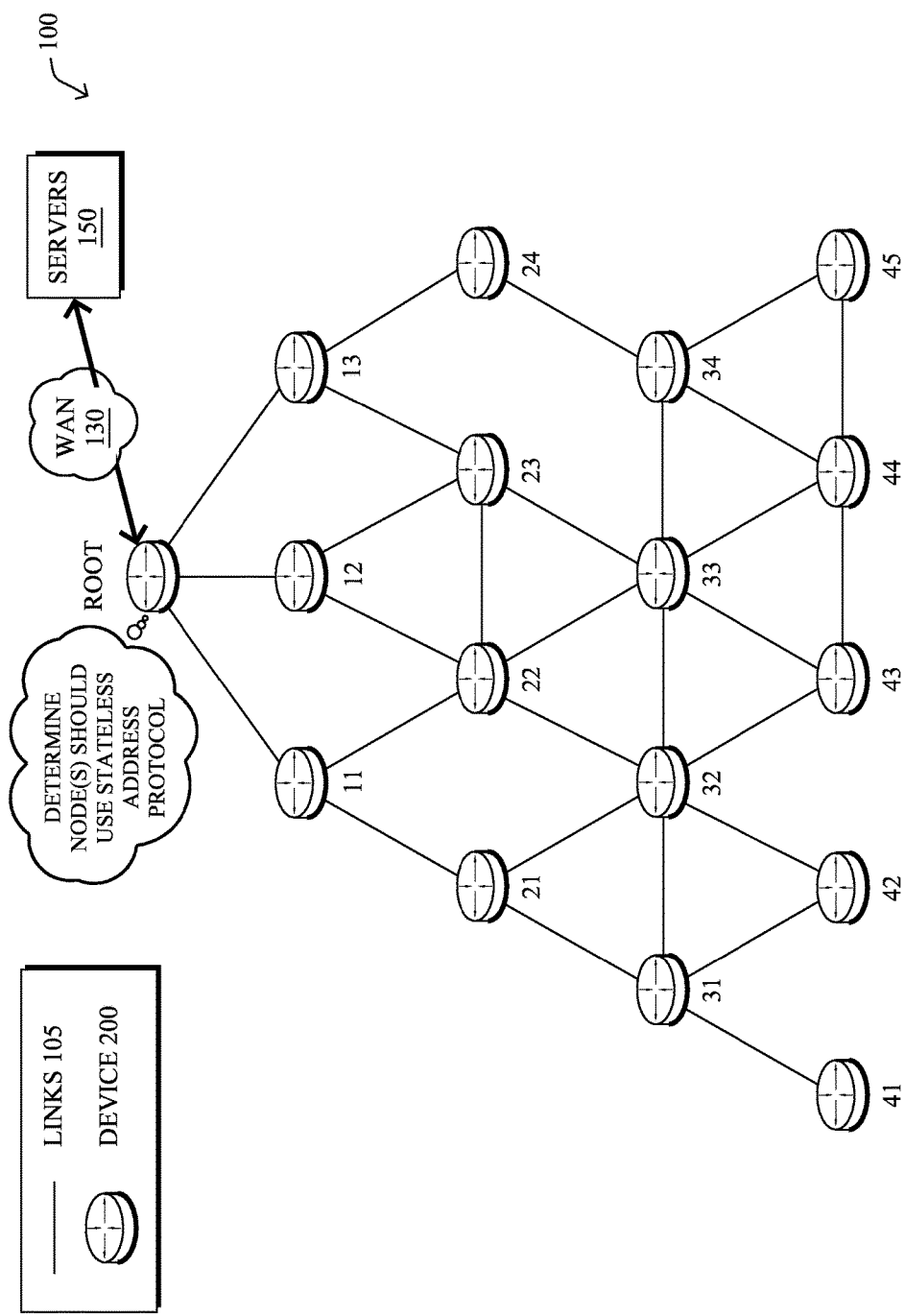
FIGS. 7A-7B illustrate an example of network devices switching to using a stateless address configuration protocol.
Figure 7B:
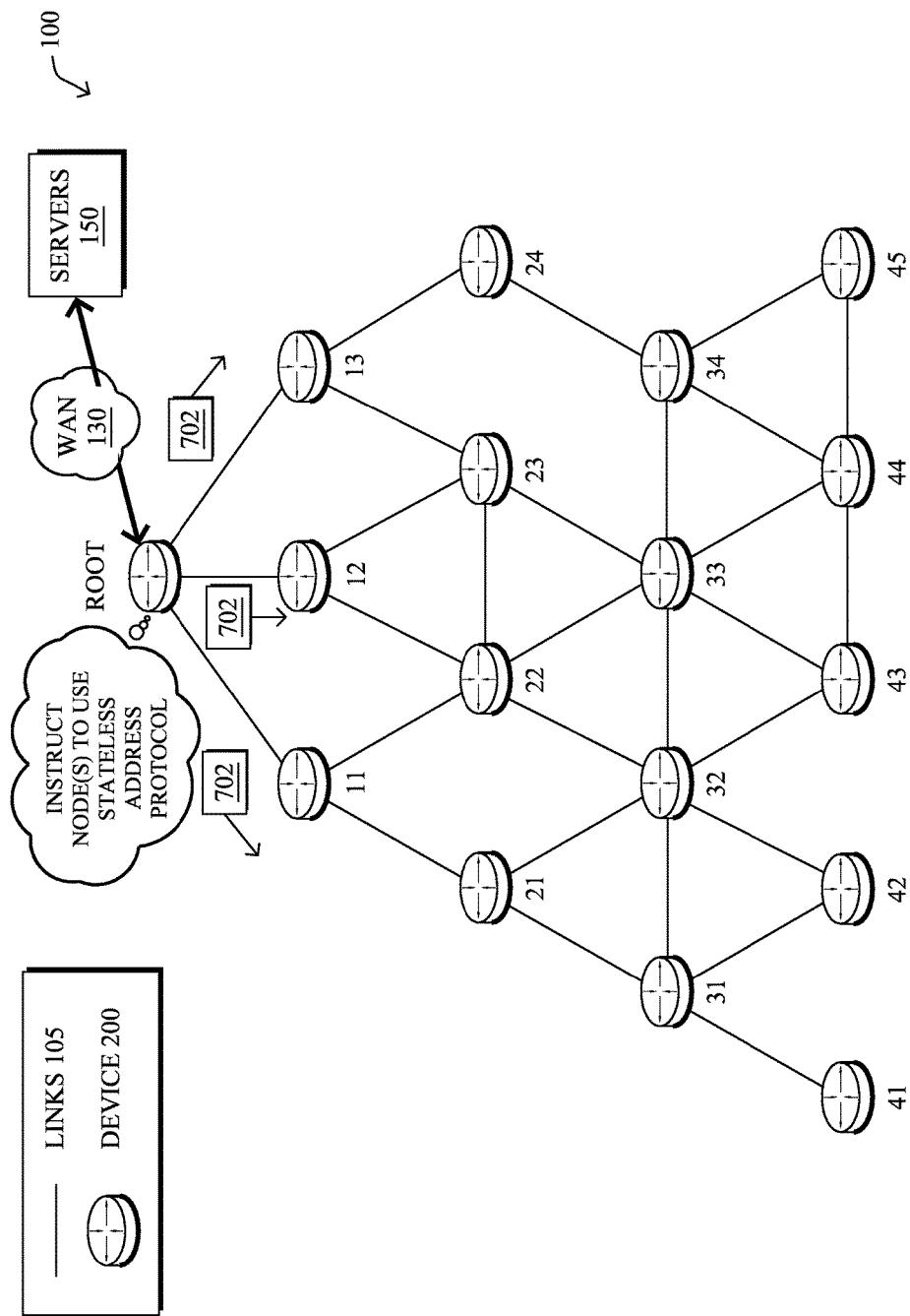

Referring now to FIGS. 7A-7B, an example is shown of network devices switching to using a stateless address protocol, according to various embodiments. As shown in FIG. 7A, a supervisory network device such as an LBR/Root device may determine that SLAAC or another stateless address protocol should be used in the network. In some cases, the benefits of using DHCPv6 or another stateful protocol may be outweighed by the simplicity of using a stateless address configuration protocol. For example, assume that the traffic pattern in network 100 varies such that the overall network traffic or the traffic from one region of network 100 (e.g., subset 604) is relatively light. In such cases, the more efficient header compression available through DHCPv6 assigned addresses may no longer be significant and the supervisory device may determine that SLAAC or another stateless protocol may be more desirable. As noted previously, another situation in which the supervisory device may determine that the stateless address configuration protocol should be used is after a power outage event or, more generally, when it determines that a significant number of nodes are expected to join the network.

As shown in FIG. 7B, the supervisory device may cause one or more nodes in the network to switch to using the stateless address configuration protocol. For example, the LBR/Root node may send instructions 702 to one or more of nodes 11-45 to switch from using a stateful protocol (e.g., DHCPv6) to using a stateless protocol (e.g., SLAAC) to obtain network addresses. Similar to instructions 602, the supervisory device may send instructions 702 to all nodes (e.g., via Enhanced Beacon messages, via RPL DIO messages, etc.) or only to a subset of nodes (e.g., via unicast messages to the individual nodes, via a multicast message, etc.). As part of the switchover, any node instructed to use the stateless protocol may complete a message exchange with the stateful address server (e.g., a DHCPv6 server), to return its assigned address to the pool of available addresses. In cases in which certain information was previously provided to a node via a DHCPv6 option field (e.g., address details of an NMS, AMI head end system, etc.), this information may instead be provided after the changeover to the stateless protocol in conjunction with messages according to the routing protocol, etc. For example, this information may alternatively be provided through an IEEE 802.15.4 beacon information element, an RPL option, a DNS-SD, NA option, or any other number of other provisioning protocols.

Figure 8A:
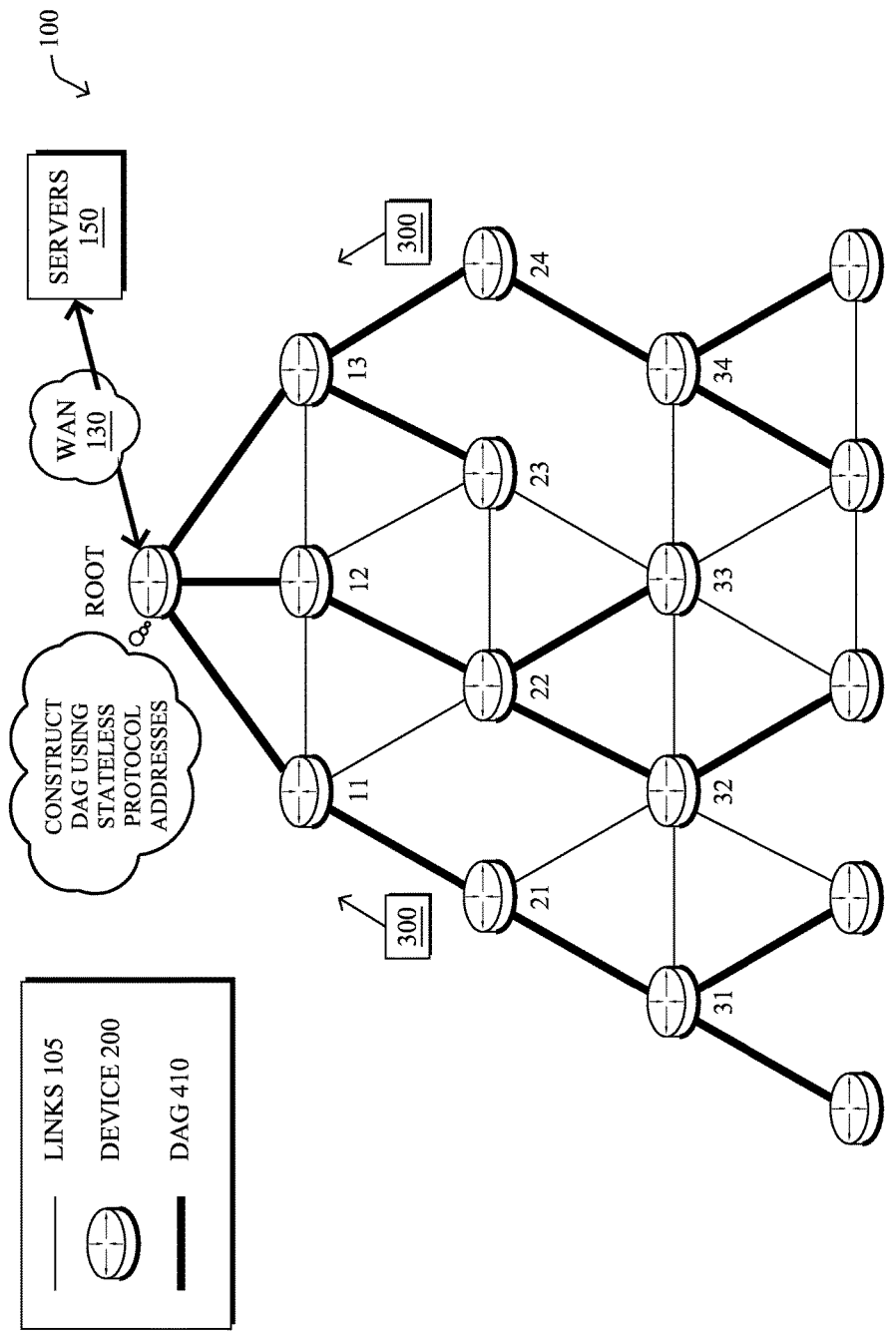
FIGS. 8A-8C illustrate an example of a routing topology being updated after an address protocol switchover.
Figure 8B:
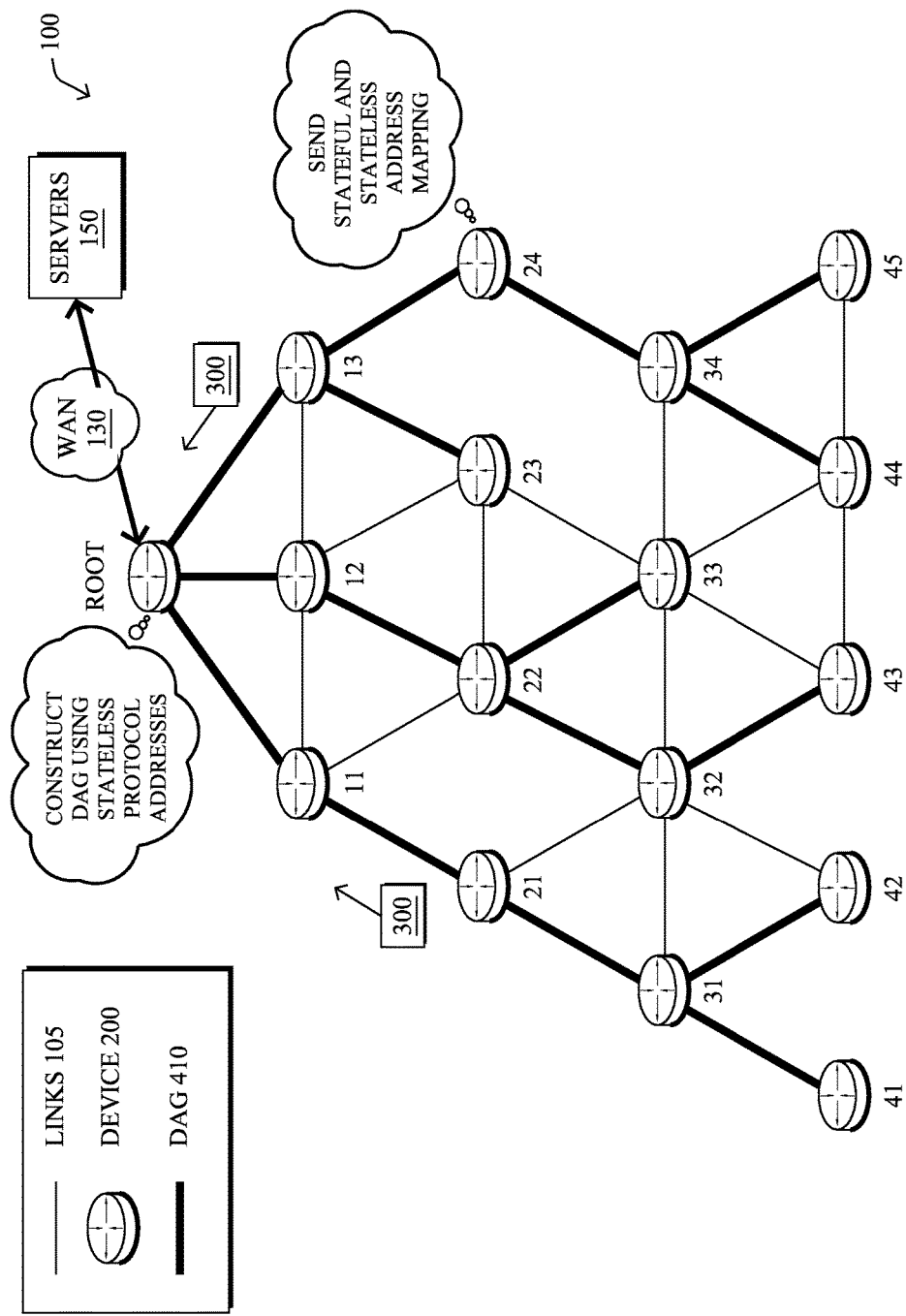
Figure 8C:
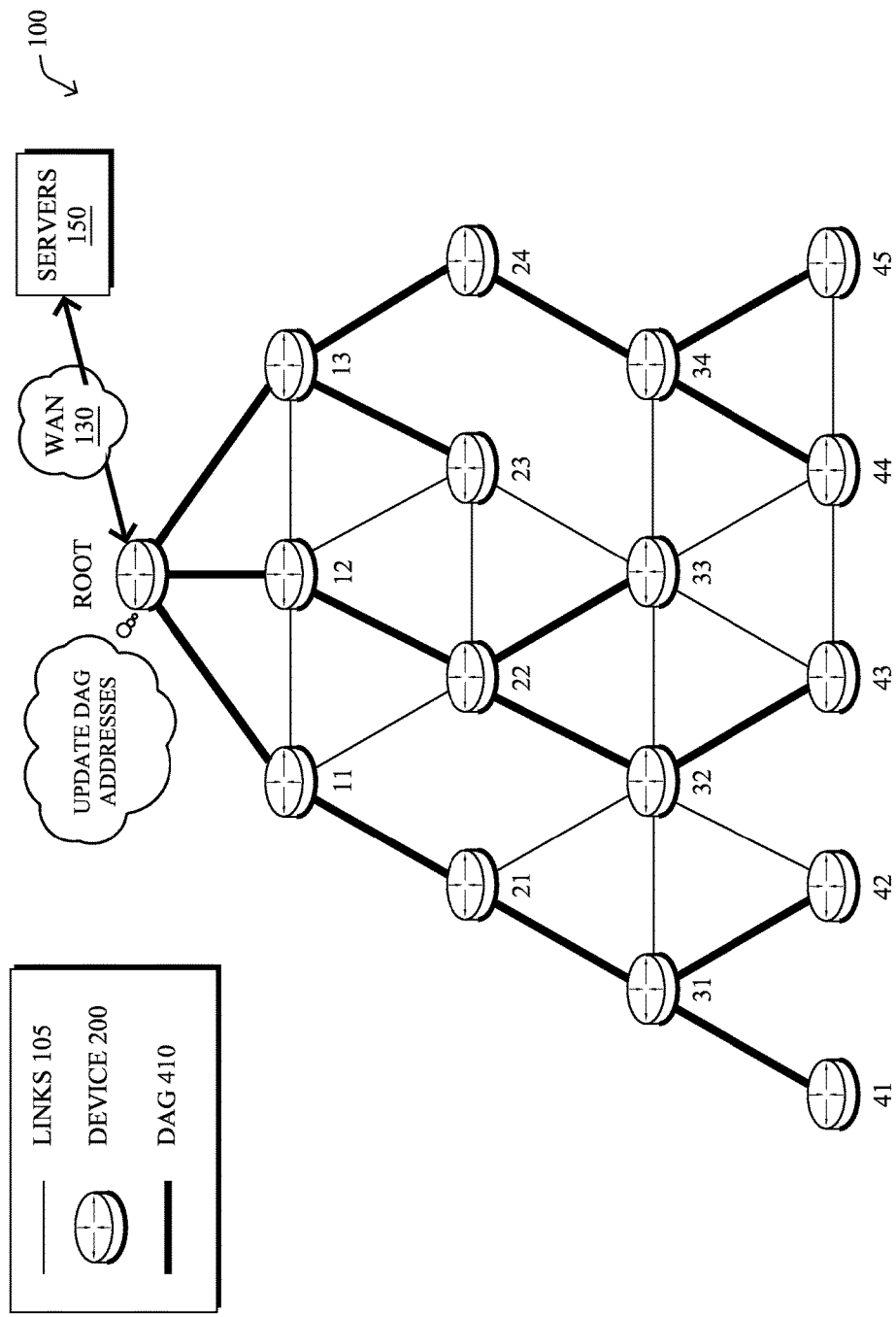

FIGS. 8A-8C illustrate an example of a routing topology being updated after an address protocol switchover, according to various embodiments. For example, a supervisory device such as an LBR/Root node may update its routing information from using SLAAC-derived addresses to using DHCPv6-derived routable addresses or vice-versa.

As shown in FIG. 8A, assume that the LBR/Root device is operable to switch nodes 11-45 between using DHCPv6 and SLAAC and that DHCPv6 is currently disabled in network 100. In such a case, the LLN will first form the routing topology with SLAAC-based addresses and RPL DAO messages 300 may include its global IPv6 address in the RPL target information option of messages 300. In response to messages 300, the LBR/Root node will then construct the routing topology (e.g., DAG 410) using the SLAAC-based addresses. Similarly, when nodes are instructed to use DHCPv6, the LLN will form the routing topology with DHCPv6-based addresses.

After a switchover between address configuration protocols, a node may be configured to send DAO messages where the IPv6 header's source address maps the node's old address to its new address in the RPL target information option of the DAO message. For example, as shown in FIG. 8B, assume that node 24 switches from using SLAAC to using DHCPv6 (e.g., as instructed by the LBR/Root node). In such a case, node 24 may send a DAO message 300 that maps its SLAAC-based address to its new DHCPv6-based address.

In response to receiving messages 300 that map IPv6 addresses for a node, the LBR/Root node may update the routing topology by replacing the old address with the new address. In another embodiment, the node that changed its address may send a DAO message with a custom DAO option (e.g., an option that explicitly indicates the replacement of the SLAAC-based address with DHCPv6-based address). For example, as shown in FIG. 8C, the LBR/Root may update the routing topology using the mapped IPv6 addresses that it receives after the protocol switchover.

In some cases, an application hosted by a particular node may prefer a more stable IPv6 address. In some embodiments, the node may be assigned different IPv6 addresses for routing (e.g., those included in a source route header) and for the application. For example, the DHCPv6 server may provide both types of addresses to the node. In such cases, the techniques herein may be used with respect to the switching only the routing IPv6 address.

Figure 9:
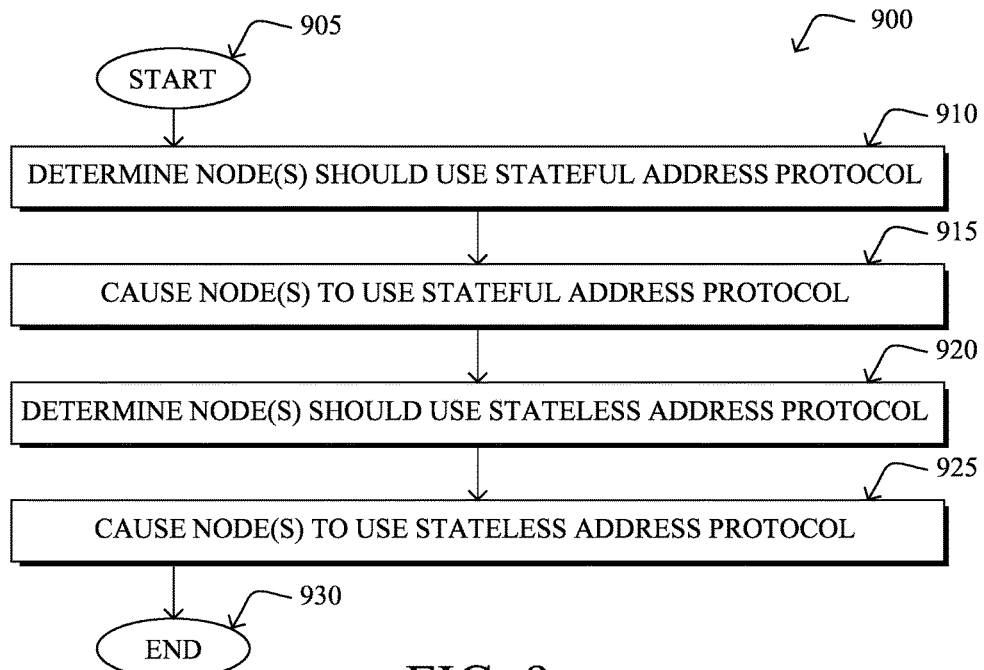
FIG. 9 illustrates an example simplified procedure for optimizing address assignment in a network.

FIG. 9 illustrates an example simplified procedure for optimizing address assignment in a network, in accordance with one or more embodiments described herein. The procedure 900 may start at step 905, and continues to step 910, where, as described in greater detail above, a network device (e.g., device 200) determines that one or more network nodes should use a stateful address configuration protocol. In general, a defining characteristic of such a protocol is the use of a centralized server/service that coordinates address assignments. For example, the network device may determine that the one or more nodes should use DHCPv6 or another stateful protocol to obtain network addresses. Notably, a stateful address configuration protocol may enable address compression in the local network and/or provide other optimizations.

At step 915, the device causes the one or more network devices to use the stateful address configuration protocol, as described in greater detail above. In response to determining that the one or more nodes should use the stateful address protocol, the device may cause the one or more nodes to switch protocols in a variety of ways. If the protocol switchover is to be network-wide, the device may send instructions to the nodes via RPL DIO messages, via enhanced beacon messages, etc. However, in some cases, the one or more nodes may correspond to only a subset of the network. In such cases, the device may send the instructions as unicast messages to the individual nodes or as a multicast group, either explicitly or using a Bloom filter or other mechanism.

At step 920, as highlighted above, the device may determine that the one or more nodes should use a stateless address configuration protocol to obtain network addresses. In contrast to a stateful protocol, a defining characteristic of a stateless address configuration protocol is the ability for a node to obtain an address in a decentralized manner. For example, a node using SLAAC or a similar protocol may determine its address based on IP prefix information that it obtains from a neighboring device.

In various embodiments, the network device may base its determinations in steps 910 and 920 (e.g., whether to use a stateful or stateless address protocol) on which protocol affords the greater optimizations in view of the network's current and/or expected conditions. Notably, the stateful protocol may allow for address compression, but at the expense of additional traffic to the central address server. In one embodiment, the device may determine that the one or more nodes should use the stateless address protocol when it is expected that nodes are going to be joining the network (e.g., after a power outage event, etc.). Conversely, the device may determine that the one or more nodes should use the stateful address protocol after network formation is complete. In another embodiment, the device may determine that the node(s) should use the stateful address protocol if the rate of source route messages exceeds a threshold (e.g., to allow enhanced address compression to be used). In a further embodiment, the supervisory device may base the protocol selection on estimated network overhead cost estimates associated with using each protocol. For example, the LBR or other supervisory device may determine the overhead (e.g., measured in bytes/sec) of sending large source route headers vs. using DHCPv6 messaging and sending smaller source route headers. In yet another embodiment, the device may base the protocol selection on one or more node configuration techniques supported by the address protocol. For example, the device may base the selection in part on the ability of the address protocol to provide additional configurations to a node (e.g., the stateful address protocol may support 6LoWPAN compression contexts, etc.).

At step 925, the network device causes the one or more nodes to use the stateless address configuration protocol, as described in greater detail above. Similar to step 915, the device may effect the protocol switchover network wide or with a subset of the network. Accordingly, the device may send instructions to the one or more nodes to initiate the changeover as unicast messages, multicast messages, piggybacked on messages broadcast via the routing protocol, or in any other way. In some embodiments, the device may perform steps 915 and 925 by including timing information with an instruction to switch address protocols. For example, the device may instruct a node to use one protocol for a certain amount of time and, once the indicated time period is over, switch back to using the other protocol. Procedure 900 then ends at step 930.

Figure 10:
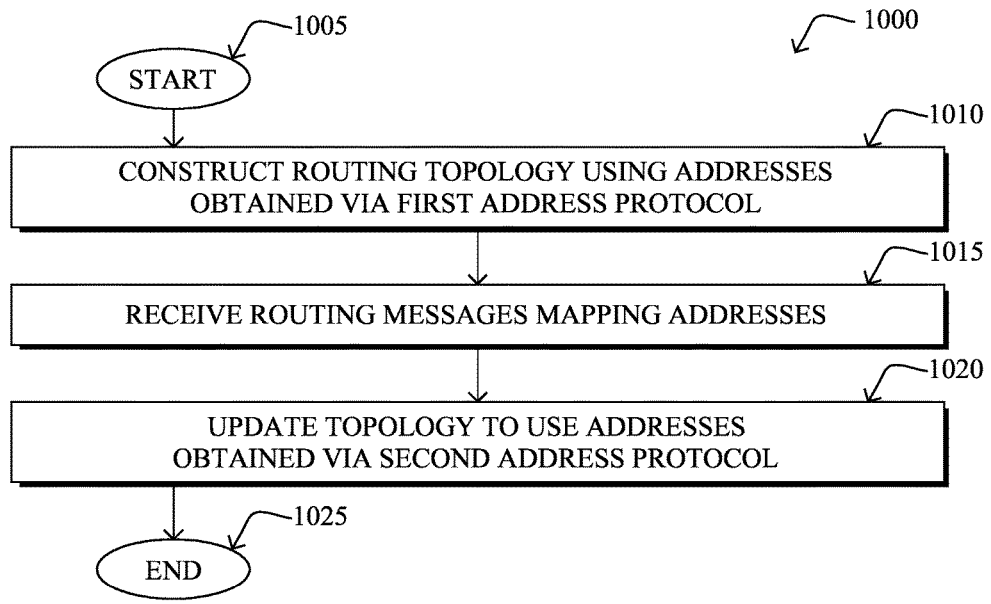
FIG. 10 illustrates an example simplified procedure for updating a routing topology after an address protocol switchover.

FIG. 10 illustrates an example simplified procedure for updating a routing topology after an address protocol switchover, in accordance with one or more embodiments described herein. The procedure 1000 may start at step 1005, and continues to step 1010, where, as described in greater detail above, a network device (e.g., device 200) constructs a routing topology using an address obtained via a first address configuration protocol. For example, an LBR/Root node of an LLN may determine a routing topology for the network using address information obtained using a stateful address protocol (e.g., DHCPv6) or a stateless address protocol (e.g., SLAAC).

At step 1015, the device receives a routing message that maps addresses obtained using different address configuration protocols, as detailed above. For example, assume that SLAAC-based address information is used in step 1010 to form the routing topology. In such a case, the device may receive a DAO message that maps the SLAAC-based address to a DHCPv6-based address, after a protocol switchover is initiated in the network. A similar mapping may also be used if a node switches from using DHCPv6 to SLAAC to obtain its network address.

At step 1020, the device updates the routing topology to use the address information obtained via the second protocol, as described in greater detail above. For example, the device may update DAG information to use the address information obtained using the second address protocol, after an address protocol switchover has occurred in the network. Procedure 1000 then ends at step 1025.

It should be noted that while certain steps within procedures 900-1000 may be optional as described above, the steps shown in FIGS. 9-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1000 are described separately, certain steps from each procedure may be incorporated into each other procedure, and the procedures are not meant to be mutually exclusive.

The techniques described herein, therefore, provide for optimizing address assignments in a network by dynamically switching between address configuration protocols. In various aspects, a device that effects a protocol change may base the decision on a cost-benefit analysis of using either protocol. For example, selectively enabling DHCPv6 allows the use of efficient address compression techniques (e.g., using RFC 6554 techniques), but at the cost of generating more traffic. The resulting traffic may not be ideal under certain circumstances, such as during network (re)formation. For example, during a warm start, the following messages may travel through the network LBR/Root node: two DHCPv6 messages, one RPL DAO messages, and two CSMP registration messages, for a total of five messages. Using SLAAC instead of DHCPv6 would reduce the number of messages to three (e.g., by eliminating the DHCPv6 messages), which is a 40% decrease in the traffic sent through the Root node. Conversely, noticeable savings may also exist when address compression is used in conjunction with the stateful address protocol, which may also be a function of the traffic profile in the network.

While there have been shown and described illustrative embodiments that provide for optimizing address assignments in a network, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a device in a network, that one or more network nodes should use a stateful address configuration protocol to obtain network addresses;
   causing, by the device, the one or more network nodes to use the stateful address configuration protocol, in response to determining that the one or more nodes should use the stateful address configuration protocol to obtain network addresses;
   determining, by the device, that the one or more network nodes should use a stateless address configuration protocol to obtain network addresses;
   causing, by the device, the one or more network nodes to use the stateless address configuration protocol, in response to determining that the one or more nodes should use the stateless address configuration protocol to obtain network addresses;
   constructing, by the device, a routing topology for the network based on routing messages received from the one or more network nodes that include network addresses obtained by the one or more network nodes using the stateless address configuration protocol;
   receiving, at the device, routing messages from the one or more network nodes that map the network addresses obtained using the stateless address configuration protocol to network addresses obtained using the stateful address configuration protocol; and
   updating, by the device, the routing topology to use the network addresses obtained using the stateful address configuration protocol.

2. The method as in claim 1, wherein the stateful address configuration protocol is the Dynamic Host Configuration Protocol version 6 (DHCPv6).

3. The method as in claim 1, wherein the stateless address configuration protocol is the Stateless Address Autoconfiguration (SLAAC) protocol.

4. The method as in claim 1, wherein determining that the one or more network nodes should use the stateful address configuration protocol to obtain network addresses comprises:
   determining, by the device, that a rate of source route messages in the network exceeds a threshold.

5. The method as in claim 1, wherein determining that the one or more network nodes should use the stateless address configuration protocol to obtain network addresses comprises:
   determining, by the device, that a plurality of nodes are expected to join the network.

6. The method as in claim 5, wherein determining that the plurality of nodes are expected to join the network comprises:
   identifying, by the device, a power outage event in the network.

7. The method as in claim 1, wherein determining that the one or more network nodes should use the stateful address configuration protocol to obtain network addresses comprises:
   determining, by the device, that formation of the network is complete.

8. The method as in claim 1, wherein the one or more nodes are configured to rate limit traffic associated with obtaining network addresses using the stateful address configuration protocol.

9. The method as in claim 1, wherein the one or more nodes are configured to use the stateless address configuration protocol by default.

10. The method as in claim 1, wherein the device determines that the one or more network nodes should use the stateful address configuration protocol to obtain network addresses based on network overhead cost estimates associated with using the stateful and stateless address configuration protocols in the network.

11. The method as in claim 1, wherein the device determines that the one or more network nodes should use the stateful address configuration protocol based in part on a node configuration technique facilitated by the stateful address protocol.

12. An apparatus, comprising:
    one or more network interfaces to communicate with a network;
    a processor coupled to the one or more network interfaces and configured to execute a process; and
    a memory configured to store the process executable by the processor, the process when executed operable to:
       determine that one or more network nodes should use a stateful address configuration protocol to obtain network addresses;
       cause the one or more network nodes to use the stateful address configuration protocol, in response to determining that the one or more nodes should use the stateful address configuration protocol to obtain network addresses;
       determine that the one or more network nodes should use a stateless address configuration protocol to obtain network addresses;
       cause the one or more network nodes to use the stateless address configuration protocol, in response to determining that the one or more nodes should use the stateless address configuration protocol to obtain network addresses;

construct a routing topology for the network based on routing messages received from the one or more network nodes that include network addresses obtained by the one or more network nodes using the stateless address configuration protocol;

receive routing messages from the one or more network nodes that map the network addresses obtained using the stateless address configuration protocol to network addresses obtained using the stateful address configuration protocol; and update the routing topology to use the network addresses obtained using the stateful address configuration protocol.

13. The apparatus as in claim 12, wherein the stateful address configuration protocol is the Dynamic Host Configuration Protocol version 6 (DHCPv6).

14. The apparatus as in claim 12, wherein the stateless address configuration protocol is the Stateless Address Autoconfiguration (SLAAC) protocol.

15. The apparatus as in claim 12, wherein the apparatus determines that the one or more network nodes should use the stateful address configuration protocol to obtain network addresses by:

determining that a rate of source route messages in the network exceeds a threshold.

16. The apparatus as in claim 12, wherein the apparatus determines that the one or more network nodes should use the stateless address configuration protocol to obtain network addresses by:

determining that a plurality of nodes are expected to join the network.

17. The apparatus as in claim 12, wherein the apparatus determines that the plurality of nodes are expected to join the network by:

identifying a power outage event in the network.

18. The apparatus as in claim 12, wherein the apparatus determines that the one or more network nodes should use the stateful address configuration protocol to obtain network addresses by:

determining that formation of the network is complete.

19. The apparatus as in claim 12, wherein the one or more nodes are configured to rate limit traffic associated with obtaining network addresses using the stateful address configuration protocol.

20. The apparatus as in claim 12, wherein the one or more nodes are configured to use the stateless address configuration protocol by default.

21. The apparatus as in claim 12, wherein the apparatus determines that the one or more network nodes should use the stateful address configuration protocol to obtain network addresses based on network overhead cost estimates associated with using the stateful and stateless address configuration protocols in the network.

22. The apparatus as in claim 12, wherein the apparatus determines that the one or more network nodes should use the stateful address configuration protocol based in part on a node configuration technique facilitated by the stateful address protocol.

23. A tangible, non-transitory, computer-readable media having software encoded thereon, the software when executed by a processor operable to:

determine that one or more network nodes should use a stateful address configuration protocol to obtain network addresses;

cause the one or more network nodes to use the stateful address configuration protocol, in response to determining that the one or more nodes should use the stateful address configuration protocol to obtain network addresses;

determine that the one or more network nodes should use a stateless address configuration protocol to obtain network addresses;

cause the one or more network nodes to use the stateless address configuration protocol, in response to determining that the one or more nodes should use the stateless address configuration protocol to obtain network address;

construct a routing topology for the network based on routing messages received from the one or more network nodes that include network addresses obtained by the one or more network nodes using the stateless address configuration protocol;

receive routing messages from the one or more network nodes that map the network addresses obtained using the stateless address configuration protocol to network addresses obtained using the stateful address configuration protocol; and update the routing topology to use the network addresses obtained using the stateful address configuration protocol.

* * * * *